(12) United States Patent
Zulager et al.

(10) Patent No.: US 7,986,936 B2
(45) Date of Patent: Jul. 26, 2011

(54) METHOD FOR MANAGING WIRELESS TELECOMMUNICATION BILLS

(75) Inventors: Kae Kimberly Zulager, Richmond, VA (US); Ronald Vaiden Carpenter, Richmond, VA (US)

(73) Assignee: The Bill Police, LLC, Richmond, VA (US)

( * ) Notice: Subject to any disclaimer, the term of this patent is extended or adjusted under 35 U.S.C. 154(b) by 71 days.

(21) Appl. No.: 12/360,281

(22) Filed: Jan. 27, 2009

(65) Prior Publication Data

US 2009/0197568 A1   Aug. 6, 2009

Related U.S. Application Data

(63) Continuation of application No. 10/675,501, filed on Sep. 30, 2003, now Pat. No. 7,486,944.

(60) Provisional application No. 60/415,365, filed on Oct. 2, 2002.

(51) Int. Cl.
*H04M 11/00* (2006.01)
(52) U.S. Cl. ...... 455/406; 455/407; 455/405; 455/414.3
(58) Field of Classification Search .................. 455/406, 455/407, 405
See application file for complete search history.

(56) References Cited

U.S. PATENT DOCUMENTS

| | | | |
|---|---|---|---|
| 5,027,388 A | 6/1991 | Bradshaw et al. | |
| 5,287,270 A | 2/1994 | Hardy et al. | |
| 5,483,445 A | 1/1996 | Pickering | |
| 5,649,115 A | 7/1997 | Schrader | |
| 5,659,601 A | 8/1997 | Cheslog | |
| 5,684,965 A | 11/1997 | Pickering | |
| 5,696,906 A | 12/1997 | Peters et al. | |
| 5,978,780 A | 11/1999 | Watson | |
| 6,125,173 A | 9/2000 | Jagadish et al. | |
| 6,128,603 A | 10/2000 | Dent et al. | |
| 6,434,537 B1 | 8/2002 | Grimes | |
| 6,574,465 B2 * | 6/2003 | Marsh et al. | 455/406 |
| 6,606,377 B2 | 8/2003 | Ruckart et al. | |
| 6,615,034 B1 | 9/2003 | Alloune et al. | |
| 6,631,185 B1 | 10/2003 | Fleming, III | |
| 6,892,063 B2 | 5/2005 | Savolainen | |
| 6,968,319 B1 | 11/2005 | Remington et al. | |
| 7,072,639 B2 | 7/2006 | Marsh et al. | |
| 2001/0037269 A1 | 11/2001 | Marsh et al. | |
| 2002/0026341 A1 | 2/2002 | Marsh et al. | |
| 2002/0026394 A1 | 2/2002 | Savage et al. | |
| 2002/0046147 A1 | 4/2002 | Livesay et al. | |
| 2002/0059139 A1 | 5/2002 | Evans | |
| 2002/0082991 A1 | 6/2002 | Friedman et al. | |
| 2002/0120540 A1 | 8/2002 | Kende et al. | |

(Continued)

FOREIGN PATENT DOCUMENTS

WO   WO 99/13421   3/1999

*Primary Examiner* — Charles N Appiah
*Assistant Examiner* — Randy Peaches
(74) *Attorney, Agent, or Firm* — Kilpatrick Townsend and Stockton LLP (57) ABSTRACT

A method manages wireless telecommunication bills for end user subscribers. The method includes complete bill management for the wireless subscribers including, for example, establishing a baseline report, receiving and analyzing a subscriber bill, and requesting and posting credits from wireless telecommunication providers. The method includes the creation of the baseline report in order to manage common billing components across all wireless carriers and carrier plans.

20 Claims, 6 Drawing Sheets

U.S. PATENT DOCUMENTS

| | | |
|---|---|---|
| 2002/0123949 A1 | 9/2002 | VanLeeuwen |
| 2002/0138378 A1 | 9/2002 | Leskuski |
| 2003/0036918 A1 | 2/2003 | Pintsov |
| 2003/0083968 A1 | 5/2003 | Marsh et al. |
| 2003/0216971 A1* | 11/2003 | Sick et al. ............ 705/26 |
| 2004/0203587 A1 | 10/2004 | Bekanich |

* cited by examiner

FIGURE 4A    **CONFIDENTIAL AND PROPRIETARY**

FIGURE 5

METHOD FOR MANAGING WIRELESS TELECOMMUNICATION BILLS

This application claims priority under 35 U.S.C. Section 120 as a continuation of U.S. patent application Ser. No 10/675,501, filed on Sep. 30, 2003, and issued as U.S. Pat. No. 7,486,944, which claims priority under 35 U.S.C. Section 119(e) to U.S. Provisional Application No. 60/415,365, filed Oct. 2, 2002, the disclosures of which are both expressly incorporated by reference herein in their entirety.

The present invention is directed to a method of wireless telecommunication bill management for end user subscribers. The method provides complete bill management for wireless subscribers including, for example, establishing a baseline report, receiving and analyzing a subscriber bill, requesting an posting credits from wireless telecommunication providers.

BACKGROUND OF INVENTION

Cellular phone bills are confusing and difficult to manage. Federal Communications Commission statistics from the fourth quarter of 2001 show 1,323 of 2,423 complaints relating to wireless service were about billing. This illustrates obvious confusion and dissatisfaction with the billing process. Businesses are especially susceptible to extraordinary costs due to the variable nature of the rate plans and usage; it is one of the few costs that is billed by the minute and therefore can significantly change by an hour or two of extra usage. Typically, subscribers do not know how to read their communications bill, and because of this, subscribers are often being billed incorrectly. This frequently results in significantly higher bills than necessary and mismatched applications of technology.

According to the Strategis group, "Wireless voice service has reached a commodity status, whereby all carriers across the United States offer voice minutes to subscribers at very competitive rates" (US cellular/PCS marketplace: outlook and forecasts, 2001). This translates to three important factors in the wireless market today: 1. Because the carriers are marketing based on commodity pricing, they are more focused on the consumer market and not the business market. 2. Because the commodity prices continue to fall, there are not only decreasing margins on rate plans, but also are offering a greater number of rate plans. Therefore, as their own margins decrease, carriers are not rewarded to service these customers proactively, nor are they rewarded to make the bills correct. 3. Because the commodity structure now focuses on price, carriers gain subscriber adds by lowering rate plans. These prices are falling an average of 5% per year.

Presently, any subscriber can manage his or her own wireless bill; however, this requires them to have:

1. Billing knowledge to insure they can correctly read a bill to determine its format and what is it telling the user.

2. Wireless knowledge to confirm the rate plans that are supposed to be billed are in fact the ones that are being billed and the details of the plan (minutes, coverage areas, features etc) are equivalent to what their plan offers.

3. The format to simplify the process and enable the user to identify comparisons to a baseline.

4. Wireless carrier knowledge to negotiate through the carrier end of the billing cycle to get credits posted. Although the layperson may be able to have some of these processes in place, they probably do not have all and thus cannot implement the same process as the discussed method.

In addition, some of the carriers are offering services to help subscribers onto a better rate plan if the subscriber initiates a call to a national customer service number and asks for a better rate plan. Further, some of the national account managers for carriers will sometimes meet with larger subscribers to go over new options. However, the options suggested usually are changes that reflect a financial benefit to the carrier and require action to be taken by the end user. This inquiry also takes the end user's time and also requires that the user will have some level of wireless expertise on which to make a decision.

Also, all billing systems that have been created are in the best interest of the carriers to make their billing easier to distribute to end users. The typical "bill management" searches reveal creations or enhancements to systems that are used by the carrier. Although the message being conveyed is a rate plan analysis, most information provided here is not using a baseline for comparison, nor does it have the best interest of the end user in mind.

SUMMARY OF THE INVENTION

What is needed is a method that capitalizes on the carriers' deficiencies and makes them significant business opportunities. The method described herein does this in several ways: first, the process focuses on management of the business subscribers. The problem is that the subscriber does not have the expertise to look at the bill, find the billing error, nor have the mechanism to know how to go about fixing it and making sure it is fixed once it has been identified. In the present method, errors are easily spotted after a baseline has been established. Further, errors are not only fixed, but followed-up on to confirm credits have posted. It is important to note that this process takes place proactively, so the subscriber is made aware of it without any investment of time on the part of the subscriber.

Second, because of the myriad pricing options, subscribers are often unsure about what price plan they purchased, what is included in that plan, what features are included, and how the specific plan should look on the bill. Establishing the baseline report makes the process more understood.

Third, because rates are falling, the method described herein may include a mechanism to alert a subscriber (again proactively) to a new rate plan that has come out (carriers will often make significant changes to their rate plan scheme about every 6 months) which will lower their rates.

DETAILED DESCRIPTION OF THE INVENTION

Figure 1:
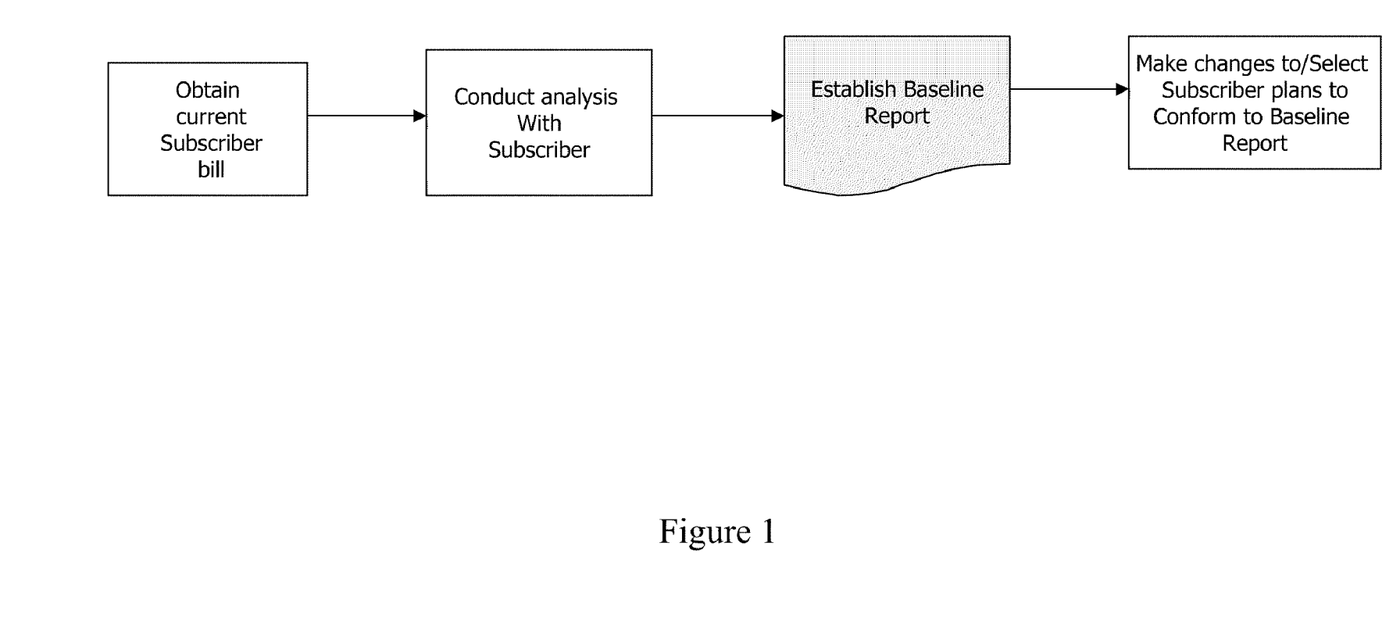
FIGS. 1-3 are flow charts demonstrating alternative steps in the method described herein.

The fundamental component of the invention is the baseline template report (see FIG. 1). The baseline report is the basis for the process and the point from which all analysis takes place; it is created in order to manage common billing components across all wireless carriers. The baseline is derived from the subscriber's account including number of wireless users, their minutes of use, calling patterns, coverage requirements and feature needs. From this, a template (baseline report) is created to define the best rate plan fit to conform to the subscriber's usage. The plan that best conforms to the baseline report of usage requirements may be a single rate plan from a single carrier. It may be determined that the baseline calls for a plurality of plans from the same and/or different plan carriers. The baseline report also defines what the wireless bill should look like each month. After the baseline is created, analysis is conducted both retrospectively each month to compare actual usage and billing to the baseline and prospectively to compare the usage to other potential rate plans or carriers.

To be useful across all wireless carriers, the baseline template must contain several common denominators. For example, all carriers have access fees and measure costs by minutes of use, so these are two mandatory components of the baseline template. Further, the baseline must include all users denoted by name, phone number and rate plan. It must show the minutes of use broken down between any categories of time (e.g. minutes of use for peak, off-peak, nights and weekends, etc.). It is also important that any additional details of the rate plans with associated costs are documented. This will enable the total sum of the fees and services for each person to compare directly to the carrier's costs each month. (When the actual bill is compared to the baseline each month, it is calculated to match the carrier bill to the penny. This not only allows for direct cost and service comparison, but also allows the subscriber to pay the bill directly from the baseline statement and never have to look at the carrier bill at all). The baseline also needs to have the current dates and baseline versions to show any changes that have been made to the baseline and the date of the baseline change. (E.g. if the subscriber changes the number of users, this will change the baseline. This change needs to be documented in order for the baseline comparisons to be meaningful). The baseline needs to show the amount that the account was being billed before the management of the account to show financial and time savings for the baseline compared to before the baseline was created. Finally, as a key measurement of the bill maintenance, the baseline needs to reflect average cost per phone and average cost per minute. In actual monthly reports, this amount is compared to the baseline report to measure maintenance efficacy.

Figure 2:
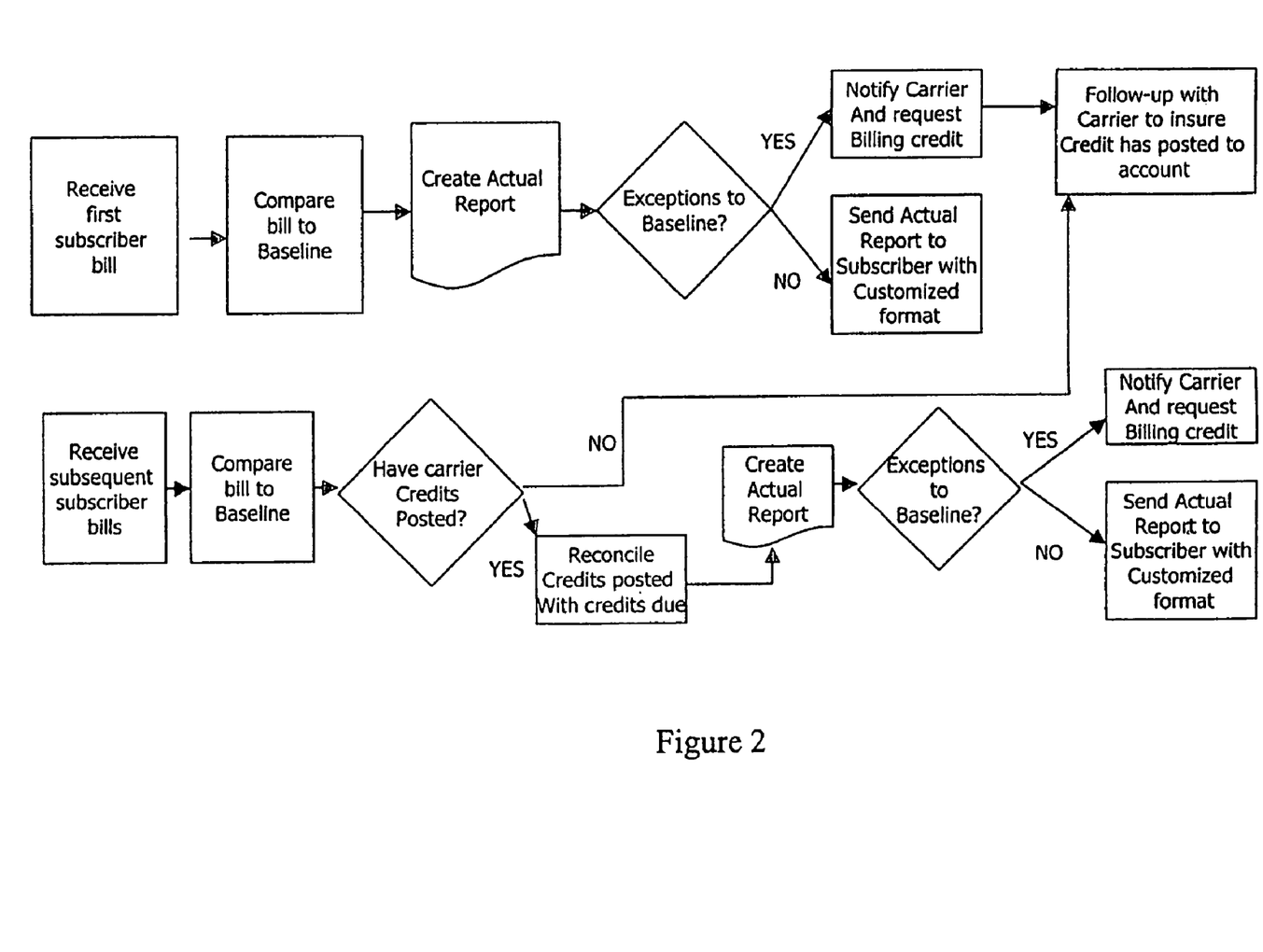
Figure 3:
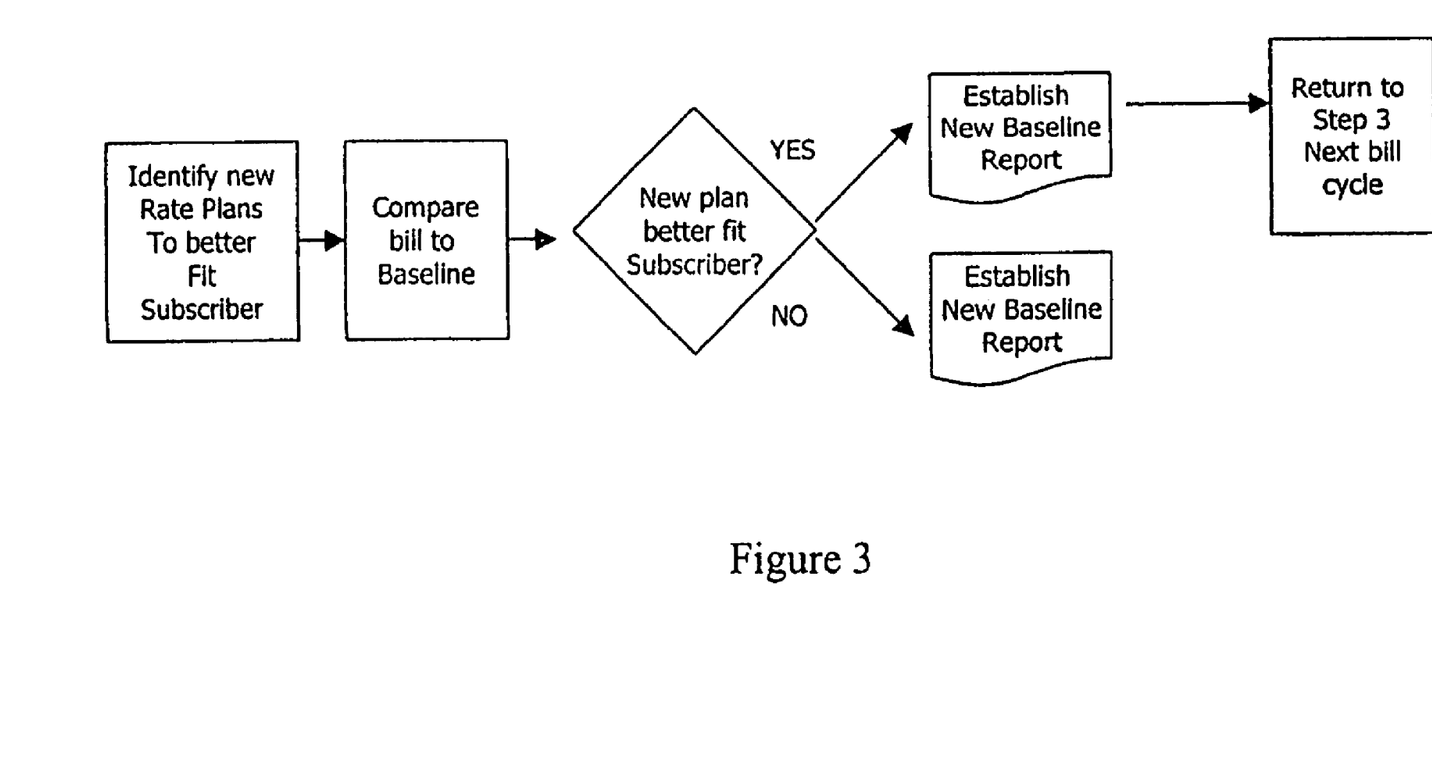

Turning now to FIGS. 2 and 3, there is shown in a flow chart fashion the additional steps of the present method. There is noted the comparison of actual bills received by the subscriber to the baseline report. If there are exceptions to that baseline report, a carrier is notified and credit is requested. Subsequent bills are similarly compared to the baseline and tracked for accuracy then for confirmation that past credits have been posted.

Figure 4:
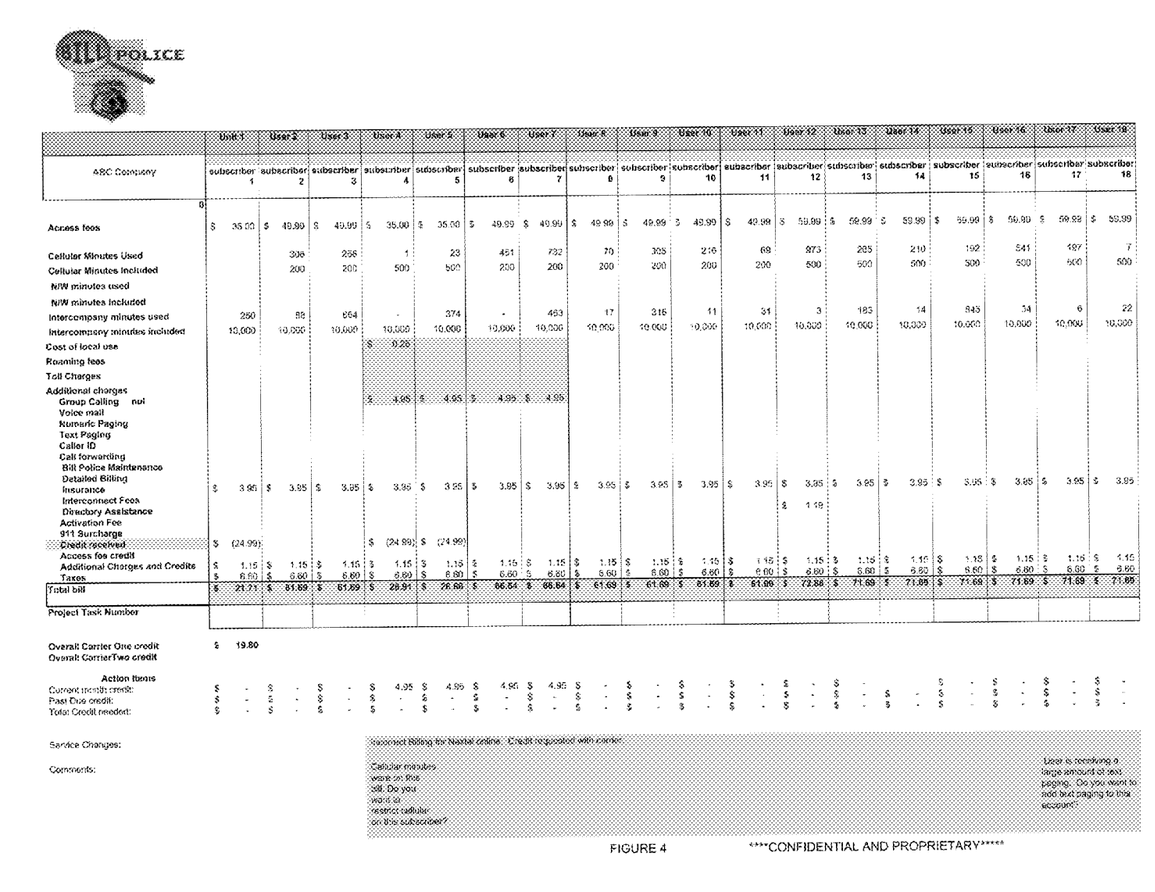
FIGS. 4 and 4A demonstrate an actual comparison of a monthly bill from a carrier to the baseline.
Figure 4A:
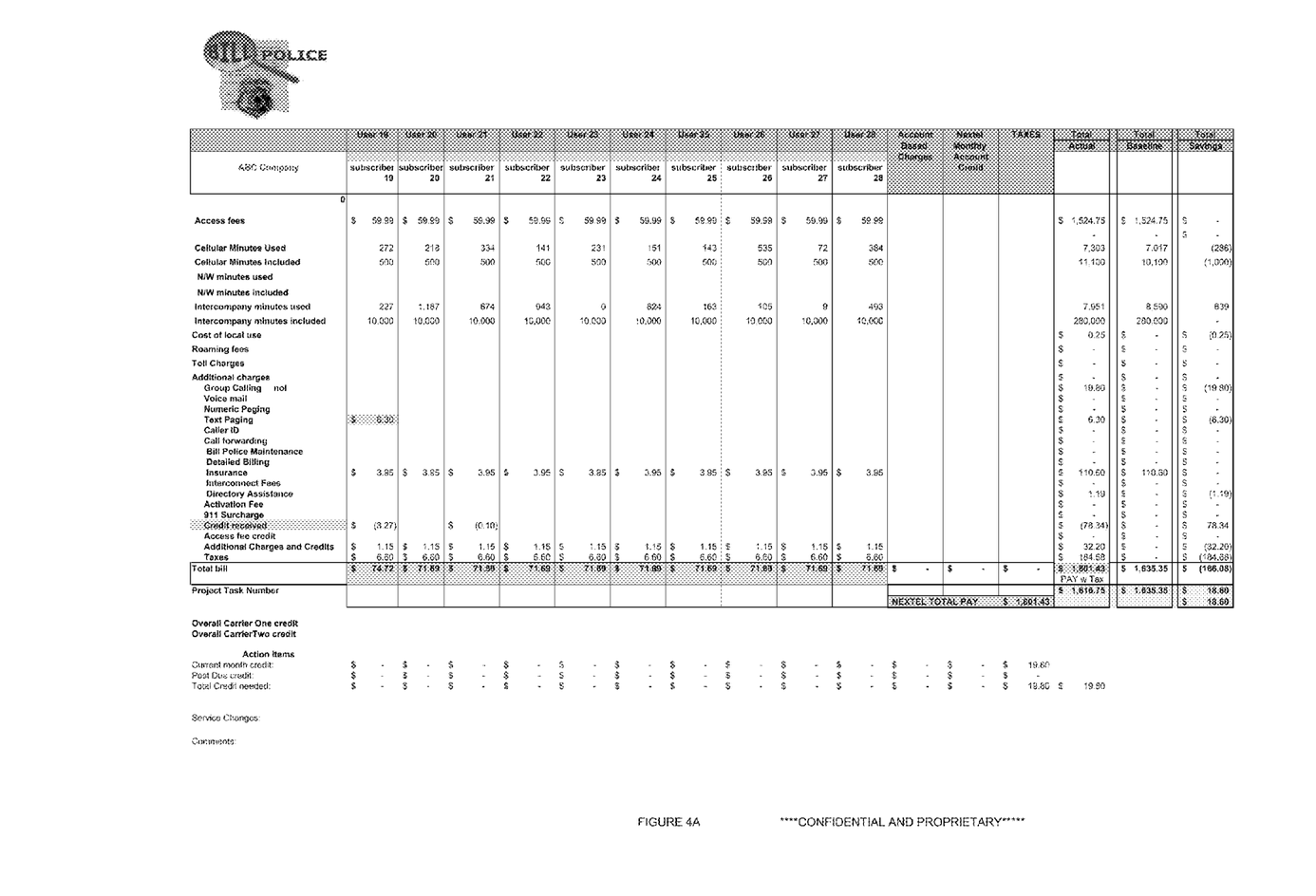

A second component of the present method is the comparison of the actual monthly bill from the carrier to the baseline (retrospective—see FIGS. 4 and 4A). This actual billing template report must show all users in the same format of the baseline with current monthly billing totals. This allows for direct apples to apples comparison of the monthly bill to the predicted, managed baseline. The totals must be separated by user with all detailed costs matching the amount of the carrier bill to the penny. This amount owed to the carrier needs to clearly illustrated for payment to the carrier by the subscriber.

The actual baseline template may further contain a mechanism for flagging any exceptions to the baseline. The exceptions may be incorrect billing items, or simply an alert to the subscriber that they are going over minutes, are receiving roaming fees when their plan does not cover calls in that particular area, etc. Any comparison that is different than baseline figures or that causes additional charges is considered an "exception" and needs to have the ability to be flagged as such. These flags are explained in detail in the "comments section", described below.

An additional field that may be included in the actual bill template is the "carrier credit received" field. This field illustrates any credits posted by the carrier to the bill from previous credit requests over previous billing cycles. This field reconciles the "credits due" section described below.

The actual template may also contain a section for "Action Items" which contains several additional subset components. The first is for credits due. This component shows any incorrect billing exceptions to the baseline which are indeed billing errors. The carrier is then notified of these errors for subsequent billing credits. The credits are tracked on the actual report until there is resolution and a credit posted to the account (in the carrier credit received field). The credits due should be shown both by subscriber and by the total account.

The second subset under "Action Items" is a comments field for service changes denoting any changes that need to be made on the part of the subscriber. This section shows rate plans changes that need to be completed.

The third subset is comments. This section provides additional comments to be made on the account for informational purposes. This section annotates any of the flagged items that are exceptions to the baseline. (e.g. if there is a roaming charges where one was not projected, the costs are recorded as well as where the roaming charges occurred). Based on the comments, the subscriber can manage costs.

Finally, the actual template report may show the actual total amount compared to the actual total baseline amount and to the "prior" amount to illustrate savings and maintenance efficacy.

Figure 5:
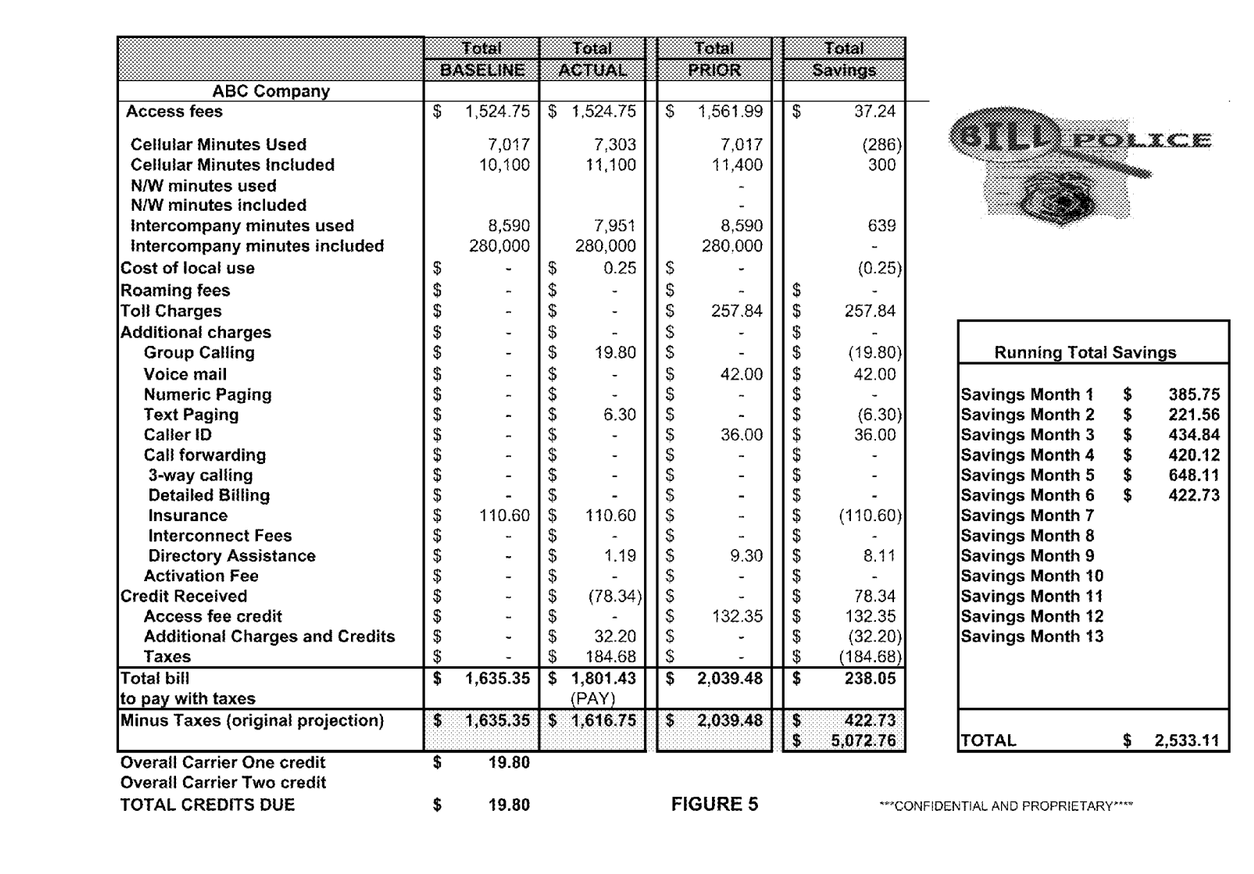
FIG. 5 demonstrates an example of a summary report in accordance with the embodiment of the present method.

A third component of the present method is a summary report (see FIG. 5) which illustrates the costs on the account level and compares the baseline account cost with the actual account cost and the prior account cost. Vital to this summary report is a running total report of savings which shows cumulative cost savings (hard cost only) over the period of the service agreement.

The final component of the present method is prospective comparison of rate plans to the baseline for future movement into other carriers or other rate plans. Historic data is used to compare baseline, actuals and prospective plans to determine the best fit for the subscriber. See FIG. 3.

EXAMPLES

The method has identified three distinct groups, for example, that may be managed. The first two are part of the mobile business users market with 10 or more users. They are the "Super subscribers" and the "Support subscribers". The following outlines the segmentation of the three groups:
Super-Service Accounts (Specific Target Market)

Super service accounts are the typical managed account. They are the subscribers who want their bills managed completely. This means the bill comes first to a third party who will then analyze the bill and manage the wireless bill completely. Subscribers will be able to process their payments directly from the baseline report at the same time distributing costs correctly within the organization. This includes:
  the monthly baseline report showing all usage by subscriber, features and minute charges in one format
  notation of billing errors (incorrect or additional billings)
  submission of corrections to their wireless carrier
  implementation and follow-up for all corrections with the carrier
  flagging of exceptional or erroneous usage
  breakdown of different users by department for billing
  suggestion of new rate plans that will result in a lower monthly cost historical management reports to more effectively use the communications process.

Support-Service Accounts (Specific Target Market)

Support service accounts are the same market as the Super service accounts. This group wants help managing the bill, but wants to deal with the carrier directly for correction and changes. They will receive the same reporting services and the same proposed changes for rate plans and credits; however, they are responsible for the implementation of these services directly with their carrier. The support subscribers' services include:

the monthly report showing all usage by subscriber, features and minute charges in one format
notation of billing errors (incorrect or additional billings)
flagging of exceptional or erroneous usage
breakdown of different users by department for billing
suggestion of new rate plans that will result in a lower monthly cost.

Self Service Accounts (Non Target Market)

This market is the remaining business users who are not part of a 10 or more subscriber account. They may be a small business or individual business user who is reimbursed by the company for their wireless costs. They recognize a need to better manage their bill, but do not need the comprehensive service of the entire management process. They may just need an easier way to properly determine the costs and necessary credits.

The Self service subscribers' services include:

the monthly report showing all usage by subscriber, features and minute charges in one format
notation of billing errors (incorrect or additional billings)
breakdown. of different users
the idea with the Self service users is for them to have access to an easier way for them to manage their own bills. The Bill Police will provide the format to the users for their monthly service cost with no additional support. If the Self service subscriber needs additional support, they will need to upgrade to a support or super service subscriber An alternative of the method described herein is a web-based database that will house the subscriber information and give data to the user. This database is created as an internet open source software.

In this alternative, users' bills are read from the internet or hard copy bills and are input by manual data entry into the web database. The billing information is then separated out into 1. Baseline entry and editing for baseline management, 2. Monthly statement entry and editing, 3. Consulting summary reviewing and proofing, 4. Bill Policing for internal assignments of database management, 5. Table maintenance for maintaining rate plan databases and 6. Reports to extract data into meaningful information.

A second alternative of the method invention is spreadsheet paper-based reports mailed to subscribers. Here, the bills come directly to a third party site and are input by manual data entry into the web database. The billing information is input into the baseline originally then input into the "actual" customer statement each month. This is done manually with an excel spreadsheet (see FIG. 2). Finally, the information is input into the "summary reports" (see FIG. 3) which is mailed hard copy or emailed to the customer.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A method for managing bills for a subscriber over a network, where the bills are based on usage of a service and a time period for the availability of the service, the method comprising the steps of:

conducting an initial analysis of a subscriber's service usage requirements, wherein the initial analysis is based at least on the subscriber's predicted service usage requirements and the subscriber's historical service usage;

creating a report based on the initial analysis of the subscriber's service usage requirements;

transmitting the report to the subscriber over the network;

selecting at least one service plan to conform to the initial analysis;

receiving a subsequent bill from the carrier corresponding to the subscriber's actual service usage and containing an actual billed amount;

comparing the subscriber's actual service usage to the initial analysis of the subscriber's service usage requirements to identify differences between the actual usage and the initial analysis;

identifying instances in which such differences result in additional or unexpected charges;

updating the initial analysis of the subscriber's service usage requirements based at least on the subscriber's actual service usage, on the additional or unexpected charges, and on additional subscriber's predicted service usage requirements;

comparing the updated analysis to the initial analysis to determine any differences between the updated analysis and the initial analysis, including whether the differences result in additional or unexpected charges;

determining whether a different service plan better conforms to the updated analysis based on the comparison of the updated analysis to the initial analysis;

selecting the different service plan when the determination indicates that the different service plan better conforms to the updated analysis;

determining an anticipated billed amount based on the actual usage;

creating an actual report for the subscriber;

comparing the anticipated billed amount to the actual billed amount to identify billing errors in the bill;

requesting billing credit from the service provider in the amount of the identified billing errors; and reviewing a further subsequent bill from the service provider to insure that credit was posted to the subscriber account.

2. The method of claim 1, wherein the service is a telecommunications service.

3. The method of claim 1, wherein the method is performed on a periodic basis corresponding to the generation of bills by the service provider.

4. The method of claim 1, further comprising:

identifying a new service plan;

comparing both the selected service plan and the new service plan to the analysis and the actual usage; and determining whether the new service plan better conforms to the analysis and the subscriber's actual usage.

5. The method of claim 1, wherein the step of selecting a service plan to correspond to the analysis of the subscriber's service usage requirements comprises selecting a plurality of service plans to correspond to the analysis of the subscriber's service usage requirements.

6. The method of claim 5, wherein the plurality of service plans is provided by a plurality of service plan providers.

7. The method of claim 1, wherein the analysis of a subscriber's service usage requirements includes identifying a plurality of service provider plans.

8. The method of claim 7, wherein the analysis of a subscriber's service usage requirements corresponds to a plurality of service users and usage requirements for each user.

9. The method of claim 8, wherein the analysis is further based on an organizational departmentalization for each user.

10. The method of claim 1, wherein the network is the Internet.

11. The method of claim 1, further comprising the step of transmitting the actual report to the subscriber over the network.

12. A non-transitory computer readable medium containing computer readable code causing a computer to manage service bills for a subscriber, where the bills are based on usage of the service and a time period for the availability of the service, the computer readable medium comprising: code for conducting an initial analysis of a subscriber's service usage requirements, wherein the initial analysis is based at least on the subscriber's predicted service usage requirements and the subscriber's historical service usage; code for creating a report based on the initial analysis of the subscriber's service usage requirements; code for transmitting the report to the subscriber over the network; code for selecting at least one service plan to conform to the initial analysis; code for receiving a subsequent bill from the carrier corresponding to the subscriber's actual service usage and containing an actual billed amount; code for comparing the subscriber's actual service usage to the initial analysis of the subscriber's service usage requirements to identify differences between the actual usage and the initial analysis; code for identifying instances in which such differences result in additional or unexpected charges; code for updating the initial analysis of the subscriber's service usage requirements based at least on the subscriber's actual service usage, on the additional or unexpected charges, and on additional subscriber's predicted service usage requirements; code for comparing the updated analysis to the initial analysis to determine any differences between the updated analysis and the initial analysis, including whether the differences result in additional or unexpected charges; code for determining whether a different service plan better conforms to the updated analysis based on the comparison of the updated analysis to the initial analysis; code for selecting the different service plan when the determination indicates that the different service plan better conforms to the updated analysis; code for determining an anticipated billed amount based on the actual usage; ands code for creating an actual report for the subscriber; code for comparing the anticipated billed amount to the actual billed amount to identify billing errors in the bill; code for requesting billing credit from the service provider in the amount of the identified billing errors; and code for reviewing a further subsequent bill from the service provider to insure that credit was posted to the subscriber account.

13. The non-transitory computer readable medium of claim 12, wherein the service is a telecommunications service.

14. The non-transitory computer readable medium of claim 12, wherein the method is performed on a periodic basis corresponding to the generation of bills by the service provider.

15. The non-transitory computer readable medium of claim 12, further comprising: code for identifying a new service plan; code for comparing both the selected service plan and the new service plan to the analysis and the actual usage; and code for deciding whether the new service plan better conforms to the analysis and the subscriber's actual usage.

16. The non-transitory computer readable medium of claim 12, wherein the code for selecting a service plan to correspond to the analysis of the subscriber's service usage requirements comprises code for selecting a plurality of service plans to correspond to the analysis of the subscriber's service usage requirements.

17. The non-transitory computer readable medium of claim 16, wherein the plurality of service plans is provided by a plurality of service plan providers.

18. The non-transitory computer readable medium of claim 12, wherein the analysis of a subscriber's service usage requirements includes identifying a plurality of service provider plans.

19. A system for managing bills for a subscriber, where the bills are based on usage of a service and a time period for the availability of the service, the system comprising:
   a processor module configured to:
      conduct an initial analysis of a subscriber's service usage requirements,
      wherein the initial analysis is based at least on the subscriber's predicted service usage requirements and the subscriber's historical service usage; and
      create a report based on the initial analysis of the subscriber's service usage requirements;
      compare the subscriber's actual service usage to the initial analysis of the subscriber's service usage requirements to identify differences between the actual usage and the initial analysis;
      identify instances in which such differences result in additional or unexpected charges;
      update the initial analysis of the subscriber's service usage requirements based at least on the subscriber's actual service usage, on the additional or unexpected charges, and on additional subscriber's predicted service usage requirements;
      compare the updated analysis to the initial analysis to determine any differences between the updated analysis and the initial analysis, including whether the differences result in additional or unexpected charges;
      determine whether a different service plan better conforms to the updated analysis based on the comparison of the updated analysis to the initial analysis;
      select the different service plan when the determination indicates that the different service plan better conforms to the updated analysis; and
      determine an anticipated billed amount based on the actual usage; and
      create an actual report for the subscriber;
   a transmitter module for transmitting the report and the actual report to the subscriber; selecting at least one service plan to conform to the initial analysis; and
   a receiver module for receiving a subsequent bill from the carrier corresponding to the subscriber's actual service usage and containing an actual billed amount,
   wherein the processor module is further configured to:
      compare the anticipated billed amount to the actual billed amount to identify billing errors in the bill;
      request billing credit from the service provider in the amount of the identified billing errors; and
      review a further subsequent bill from the service provider to insure that credit was posted to the subscriber account.

20. The system of claim 19, wherein the processor module is further configured to:
   identify a new service plan;
   compare both the selected service plan and the new service plan to the analysis and the actual usage; and
   determine whether the new service plan better conforms to the analysis and the subscriber's actual usage.

* * * * *